UNITED STATES PATENT OFFICE.

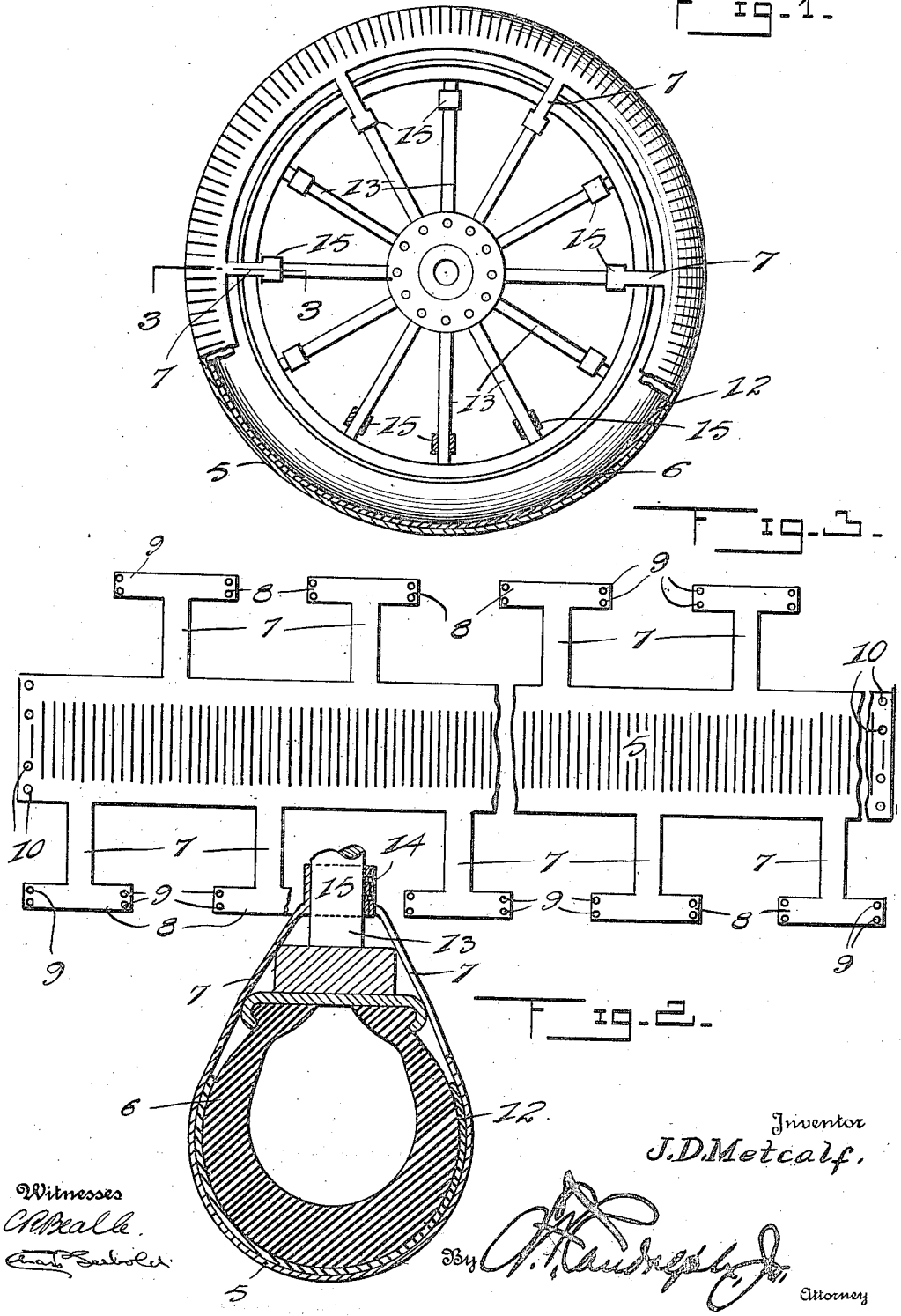

JEFFERSON D. METCALF, OF WISNER, LOUISIANA, ASSIGNOR OF ONE-HALF TO EUGENE S. POOLE, OF COLES, MISSISSIPPI.

TIRE-ARMOR.

1,229,115.  Specification of Letters Patent.  Patented June 5, 1917.

Application filed October 23, 1915. Serial No. 57,547.

*To all whom it may concern:*

Be it known that I, JEFFERSON D. METCALF, a citizen of the United States, residing at Wisner, in the parish of Franklin and State of Louisiana, have invented certain new and useful Improvements in Tire-Armor; and I do hereby declare the following to be a full, clear, and exact description of the invention, such as will enable others skilled in the art to which it appertains to make and use the same.

This invention relates to an armor especially designed for practically inclosing the pneumatic tire of a vehicle for protecting it against wear and puncture.

The invention has for its primary object to provide a simple and reliably efficient tire armor constructed entirely of a single piece of spring sheet metal and embodying means for yieldably and movably securing it upon the spokes of the wheel.

With this and other objects in view, the invention consists in the novel construction, arrangement and formation of parts as will be hereinafter specifically described, claimed and illustrated in the accompanying drawing, in which:

Figure 1 represents a side elevation of a vehicle wheel and tire illustrating the improved armor applied thereto, partly broken away, Fig. 2 represents a plan view of the tire armor in extended position, and Fig. 3 represents a transverse sectional view on the line 3—3 of Fig. 1.

Referring to the drawing in detail, wherein similar reference numerals designate corresponding parts throughout the several views, the numeral 5 indicates a band or rim constructed of spring sheet metal, preferably steel, of adequate thickness and curved transversely to conform with the outer curvature of a pneumatic tire 6. The rim 5 is provided with a plurality of laterally projecting and staggeredly arranged extensions 7 having enlarged inner ends 8, formed with apertures 9 in their free ends. The free ends of the rim or band are also formed with apertures 10.

In applying the tire armor to a pneumatic tire, the spring rim or band 5 is expanded or spread and slipped over the tire 6 and the free ends of the band or rim are rigidly and permanently secured together by rivets, or equivalent means, inserted through the apertures 10. A lining 12 of any suitable material is inserted between the tread portion of the pneumatic tire 6 and the band or rim 5 for protecting the tire against frictional wear. The extensions 7 are arranged a distance apart corresponding to the distance between the outer extremities of the spokes 13 of the wheel and the rim or band 5 is adjusted circumferentially of the wheel so as to dispose each of the extensions 7 opposite one of the spokes 13. The enlarged ends 8 of the extensions are subsequently looped about the spokes 13 and the free ends thereof are rigidly and permanently secured together by rivets, or equivalent means, 14, positioned through the apertures 9. The loops or sleeves, indicated by the numeral 15 in Fig. 6, formed by looping the enlarged ends 8 of the extensions, are formed of adequate size to permit sliding movement of said sleeves over the spokes of the wheel, and, if desired, the tread portion of the band or rim 5 may be formed with transverse corrugations or ribs designed to prevent skidding of the wheel.

What I claim is:

The combination with a wheel including spokes and a tire, of a metallic band surrounding the tire, a plurality of laterally projecting and staggeredly arranged extensions formed on each edge of said band and adapted to extend parallel with the spokes, and elongated heads formed on the ends of the extensions and bent about the spokes and fastened together to retain the band on the tire.

In testimony whereof I affix my signature in presence of two witnesses.

JEFFERSON D. METCALF.

Witnesses:
D. D. GILL,
MAYO KENDRICK.

Copies of this patent may be obtained for five cents each, by addressing the "Commissioner of Patents, Washington, D. C."